US012262817B2

(12) United States Patent
Mayer et al.

(10) Patent No.: US 12,262,817 B2
(45) Date of Patent: Apr. 1, 2025

(54) PLAYGROUND PLATFORM ROCKER

(71) Applicant: BCI Burke Company, LLC, Fond du Lac, WI (US)

(72) Inventors: Bart Mayer, Fond du Lac, WI (US); Ryan Gentner, North Fond du Lac, WI (US)

(73) Assignee: BCI Burke Company, LLC, Fond du Lac, WI (US)

( * ) Notice: Subject to any disclaimer, the term of this patent is extended or adjusted under 35 U.S.C. 154(b) by 205 days.

(21) Appl. No.: 17/954,521

(22) Filed: Sep. 28, 2022

(65) Prior Publication Data

US 2023/0111790 A1 Apr. 13, 2023

Related U.S. Application Data

(60) Provisional application No. 63/253,303, filed on Oct. 7, 2021.

(51) Int. Cl.

| | |
|---|---|
| ***A47C 3/02*** | (2006.01) |
| ***A47C 3/025*** | (2006.01) |
| ***A61G 3/06*** | (2006.01) |
| ***A63G 9/02*** | (2006.01) |
| *A61G 5/10* | (2006.01) |

(52) U.S. Cl.

CPC ............ *A47C 3/0255* (2013.01); *A61G 3/061* (2013.01); *A63G 9/02* (2013.01); *A61G 5/104* (2013.01)

(58) Field of Classification Search

CPC ........ A63G 9/02; A63G 3/061; A47C 13/105; A47C 3/0255; A61G 5/104

See application file for complete search history.

(56) References Cited

U.S. PATENT DOCUMENTS 2,531,069 A * 11/1950 McCarty .............. A47D 13/105 472/121
3,591,233 A * 7/1971 Turcksin .................. A47C 7/14 297/282
5,115,744 A * 5/1992 Barber ..................... A63G 7/00 104/75
5,938,283 A * 8/1999 Babcock .................. A63G 9/02 297/278
6,227,790 B1 * 5/2001 Mollick ................. A61G 3/067 472/36

(Continued)

FOREIGN PATENT DOCUMENTS

CN 203244762 10/2013
CN 110639209 1/2020

OTHER PUBLICATIONS https://www.playlsi.com/en/commercial-playground-equipment/playground-components/we-go-swing/.

*Primary Examiner* — Syed A Islam
(74) *Attorney, Agent, or Firm* — Wong Meyer Smith & McConnell

(57) ABSTRACT

A playground rocker provides a rigid platform with lateral side edges suspended from side rails extending along the lateral side edges of the rigid platform. The rigid platform is suspended using broad flexible belts extending along substantially full lengths of the lateral side edges of the platform with the upper edges of the belts wrapped around the side rails and lower edges attached or wrapped along the lateral side edges of the platform. The broad flexible belts allow the rigid platform to sway side to side in a direction generally perpendicular to the side rails.

19 Claims, 2 Drawing Sheets

(56) References Cited

U.S. PATENT DOCUMENTS

| | | | | | |
|---|---|---|---|---|---|
| 6,364,594 | B1 * | 4/2002 | Kagan | A61G 3/063 414/921 |
| 6,929,553 | B1 * | 8/2005 | Diemert | A63G 9/00 472/121 |
| 7,862,442 | B2 * | 1/2011 | Tseng | A47C 3/0255 472/125 |
| 9,289,337 | B2 * | 3/2016 | Fritsche | A61G 3/061 |
| 11,376,512 | B1 * | 7/2022 | Mayer | A63G 9/12 |
| 11,938,411 | B2 * | 3/2024 | Jones | A61G 5/104 |
| 2022/0126742 | A1 * | 4/2022 | Sato | A61G 3/0808 |

* cited by examiner

PLAYGROUND PLATFORM ROCKER

CROSS-REFERENCE TO RELATED APPLICATIONS

This application claims the benefit of U.S. Provisional Application No. 63/253,303, filed Oct. 7, 2021, hereby incorporated by reference.

BACKGROUND OF THE INVENTION

The present invention relates to playground equipment and, in particular, to a platform rocker suspended from lateral side rails allowing for the platform rocker to rock, sway, or glide side to side.

Generally, playground swing sets include one or more hanging seats suspended from an upper swing frame. The seat of a swing is typically a plastic or rubber platform or support belt suspended from chains or ropes attached to the upper swing frame at an upper end and to opposed ends or corners of the seat at a lower end so that the seat can swing perpendicular to the lateral extension of the swing seat in a curved arc, like the curved arc of a pendulum.

A glider swing is a type of swing where the hanging seat is connected at four corners of the seat to provide movement more generally within a horizontal plane (and with less vertical movement compared to a traditional swing). The glider swing may be desired for larger swing seats that allow for multiple riders or for riders who desire more gentle swaying movement within a horizontal plane.

Playground swings and glider swings are typically used with the rider in a seated position on the seat with their legs dangling downward from the seat to help propel swinging movement. In this respect, the rider's legs are used to help produce momentum along a desired direction of travel. The rider's hands may grip the chains or ropes of the swing to stabilize their bodies during swinging motion.

SUMMARY OF THE INVENTION

The present invention provides a playground rocker providing a rigid platform with lateral side edges suspended from side rails extending along the lateral side edges of the rigid platform. The rigid platform is suspended using broad flexible belts extending continuously along substantially full lengths of the lateral side edges of the platform with the upper edges of the belts wrapped around the side rails and lower edges attached or wrapped along the lateral side edges of the platform. The broad flexible belts allow the rigid platform to sway smoothly side to side in a direction generally perpendicular to the side rails.

In one embodiment, the flexible belts support rigid handles attached to the flexible belts permitting the rider to push and pull on the handles with their upper body to move the platform side to side with respect to the stationary side rails. The resulting movement of the rider is a gentle and smooth swaying movement that is substantially within a horizontal plane.

In one embodiment, a width of the rigid platform and a distance between the stationary side rails accommodates a width of a standard wheelchair but is less than a width of two standard wheelchairs, and therefore, encourages centering of a single wheelchair across the width of the platform and promotes the center of gravity of the rider to be centered on the platform. Similarly, the length of the rigid platform may fit a length of a standard wheelchair and is less than a length of two standard wheelchairs, and therefore, encourages centering of the wheelchair along the length of the platform and promotes the center of the gravity to be centered on the platform. The rigid platform may also be weighted on an underside to promote a slower and smoother movement.

In one embodiment, the playground rocker is flanked by front and back loading and unloading docks which may be used with inclined ramps which allow a rider in a wheelchair to roll up the ramp to a same or similar height of the loading dock and to roll off the unloading dock and down a ramp to a ground height. In the respect, the wheelchair can mount the playground rocker by rolling in a single direction and without having to rotate or turn around. The side to side swaying motion of the rocking platform is not obstructed by the loading and unloading docks which remain stationary during side to side movement of the rocking platform. In this respect, the present invention may be more safely mounted by a rider in a wheelchair and non-riders can safely observe from the loading and unloading docks.

Specifically, the present invention provides a rocker assembly comprising a support frame extending upwardly from a ground and providing first and second horizontally extending support bars extending parallel along an axis; a platform of rigid material having a length extending along the axis and a width extending perpendicular to the axis, the platform positioned between the first and second horizontally extending support bars perpendicular to the axis; and at least one flexible sheet material attached to the first and second horizontally extending support bars on a top end and attached to sides of the platform on an opposite bottom end and configured to suspend the platform below the first and second of horizontally extending support bars and above the ground.

It is thus a feature of at least one embodiment of the present invention to provide swaying motion that is perpendicular to the direction of loading and unloading of a wheelchair and thus in a manner which prevents the wheelchair from inadvertently rolling off the platform.

The at least one flexible sheet material may extend continuously along a length of the first and second horizontally extending support bars. The at least one flexible sheet material may be wrapped around the length of the first and second horizontally extending support bars.

It is thus a feature of at least one embodiment of the present invention to restrict swaying motion to one axis of motion using flexible belt material that is wrapped around the rocker support bars and thus accommodating smaller playground areas.

The at least one flexible sheet material may extend continuously along a length of the sides of the platform. The at least one flexible sheet material may be wrapped around the length of the sides of the platform.

It is thus a feature of at least one embodiment of the present invention to eliminate mechanical hinge joints typically used to restrict movement of a rocker or glider to one axis of motion and which are prone to wear and tear and breakage.

The at least one flexible sheet material may be deformable in a direction perpendicular to the axis only. The at least one flexible sheet material may not be substantially deformable along the axis.

It is thus a feature of at least one embodiment of the present invention to utilize a natural "sling" design that provides gentle swaying motion.

At least one handle may be attached to the at least one flexible sheet material.

It is thus a feature of at least one embodiment of the present invention to allow a rider in a wheelchair to initiate movement using upper body strength only.

The at least one handle may extend rigidly upwardly from the at least one flexible sheet and extends rigidly downwardly along the at least one flexible sheet material toward the platform to provide an interposed flexible joint of the flexible sheet material between the rigid handle and the platform.

It is thus a feature of at least one embodiment of the present invention to allow a rider in a wheelchair to self-propel themselves without the assistance of another standing rider.

An elevated border may extend upwardly along at least one edge of the platform.

It is thus a feature of at least one embodiment of the present invention to minimize the risk of a rider inadvertently falling off the platform but still allowing the rider to mount and dismount the platform on at least one side of the platform.

The platform may have a width that is less than a width of two standard adult wheelchairs and may have a length that is less than a length of two standard adult wheelchairs. The platform may have a width that is less than a width of three standard adult wheelchairs and may have a length that is less than a length of three standard adult wheelchairs.

It is thus a feature of at least one embodiment of the present invention to promote centering of the rider on the platform resulting in a more comfortable and safer swaying action.

The platform may be suspended at least 12 inches above the ground.

It is thus a feature of at least one embodiment of the present invention to allow riders in wheelchairs to easily mount the platform using a low inclined ramp and thus permitting standing and sitting riders to play together.

A loading dock may have an upper surface this is substantially a height of the platform above the ground wherein the loading dock is at a first side of the platform and wherein the first side of the platform extends perpendicular to the axis.

It is thus a feature of at least one embodiment of the present invention to ensure that bystanders are not in the path of swaying motion to avoid accidents.

An unloading dock may have an upper surface this is substantially a height of the platform above the ground, wherein the unloading dock is at a second side of the platform, opposite the first side, wherein the second side of the platform extends perpendicular to the axis.

It is thus a feature of at least one embodiment of the present invention to incorporate other play features such as ramps and bridges around the rocker component without introducing a gap between play structures and allowing the rocker feature to be part of a larger play structure.

An alternative embodiment of the present invention provides a method of swaying on a playground rocker comprising providing a rocker assembly having a support frame extending upwardly from a ground and providing first and second horizontally extending support bars extending parallel along an axis, a platform of rigid material having a length extending along the axis and a width extending perpendicular to the axis, the platform positioned between the first and second of horizontally extending support bars, and at least one flexible sheet material attached to the first and second horizontally extending support bars on a top end and attached to sides of the platform on an opposite bottom end and configured to suspend the platform below the first and second of horizontally extending support bars and above the ground; mounting the platform along the axis; swaying the platform in a direction perpendicular to the axis; and unmounting the platform along the axis.

It is thus a feature of at least one embodiment of the present invention to promote gentle swaying motion that centers the center of gravity.

The rocker assembly may have at least one handle attached to the at least one flexible sheet material and the method may further comprise pushing and pulling the at least one handle in a direction perpendicular to the axis.

It is thus a feature of at least one embodiment of the present invention to permit riders in wheelchairs and riders who are standing to operate the same handles and thus play together.

The method may further comprise wrapping the at least one flexible sheet material around the first and second of horizontally extending support bars on a first end and wrapping the at least one flexible sheet material around sides of the platform on an opposite second end.

It is thus a feature of at least one embodiment of the present invention to distribute the forces on and of the swaying platform along an extended length of the sheet material.

Mounting the platform and unmounting the platform may be in opposite directions along the axis.

It is thus a feature of at least one embodiment of the present invention to discourage rotation of a rider in a wheelchair to keep movement of the rocker in a direction that is perpendicular to the direction of wheelchair motion.

Mounting the platform and unmounting the platform may be in a same direction along the axis.

It is thus a feature of at least one embodiment of the present invention to allow a rider in a wheelchair to mount and unmount the swaying platform in a single direction thus allowing the next rider to mount the loading platform while they are waiting for their turn to sway.

A center of rotation of the platform during swaying motion may be within 12 inches of a center of gravity of the rider on the platform.

It is thus a feature of at least one embodiment of the present invention to facilitate a natural pendulum motion while controlling inertia without a resistance device.

An alternative embodiment of the present invention provides a rocker assembly comprising a support frame providing first and second horizontally extending support bars extending parallel along an axis; a platform of rigid material having a length extending along the axis and a width extending perpendicular to the axis, the platform positioned between the first and second horizontally extending support bars perpendicular to the axis; at least one linkage attached to the first and second horizontally extending support bars on a first end and attached to sides of the platform on an opposite second end and configured to suspend the platform below the first and second of horizontally extending support bars and above the ground; and at least one handle attached to the at least one linkage to provide a flexible joint of the linkage between the handle and the platform, the flexible joint capable of being flexed perpendicular to the axis.

These particular objects and advantages may apply to only some embodiments falling within the claims and thus do not define the scope of the invention.

DETAILED DESCRIPTION OF THE INVENTION

Figure 1:
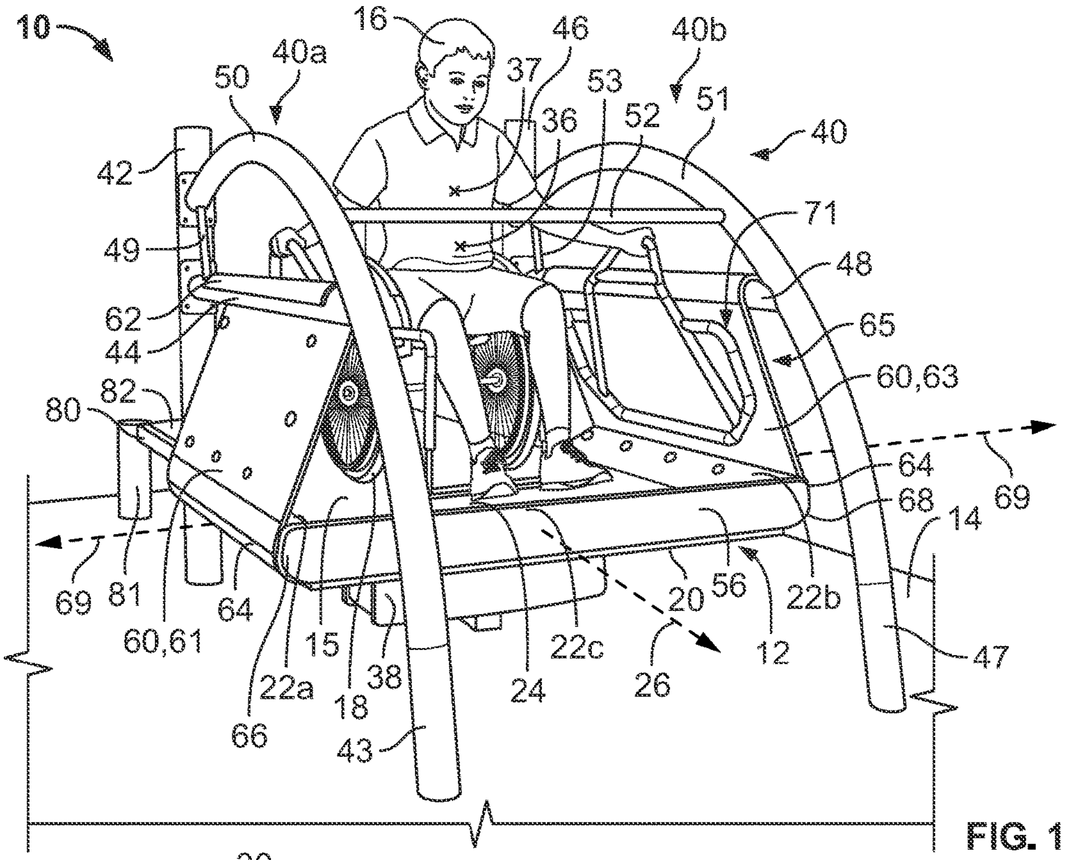
FIG. 1 is a front, left side perspective view of a platform rocker according to one embodiment of the present invention showing the rigid platform suspended from stationary side rails by broad flexible belts having upper edges attached to the side rails and lower edges attached to the lateral side edges of the platform and further including a loading dock to provide a "non-pass-through" design.

Referring to FIG. 1, a platform rocker assembly 10 according to one embodiment of the present invention may provide a platform 12 that is elevated above ground 14 and supports a standing and/or sitting rider(s) 16 thereon. In some instances, the sitting rider 16 may be in a wheelchair 18 or a similar transport device with wheels. It is understood that the riders 16 may be adult and/or children riders.

The platform 12 is elevated above the ground 14 allowing the platform 12 to rock, glide, or sway side to side along an axis 69 substantially parallel to the ground 14. The platform 12 may be elevated at least 12 inches and approximately 12 to 24 inches above the ground 14. The platform 12, at a rest position, is substantially parallel to the ground 14, and when in motion, is moved side to side from the rest position, with the platform 12 moving substantially within a plane that is substantially parallel to the ground 14 as further described below.

The platform 12 may be a rectangular shape, for example, in some instances having approximately equal length and width sides (a square shape) and, in some instances, having a length that is greater than the width or a width that is greater than the length (a rectangular shape). In one embodiment, the total length of the platform 12 extending perpendicular to axis 69 may be about 70 to 80 inches and about 70 to 75 inches and approximately 72 inches and the total width of the platform 12 extending along axis 69 may be about 40 to 50 inches and about 45 to 50 inches and approximately 48 inches.

The platform 12 has an upper rectangular surface 15 facing upwards towards the sky to support a rider 16 standing or sitting in a wheelchair 18 thereon and opposite a lower rectangular surface 20 facing downwards toward the ground 14. The upper surface 15 may include a raised outer border 22 surrounding a rider receiving area 24 of the platform 12 generally centered within or inside the raised outer border 22. Thus, the raised outer border 22 may help to contain the rider 16 in the rider receiving area 24 during platform 12 movement as further described below.

Figure 2:
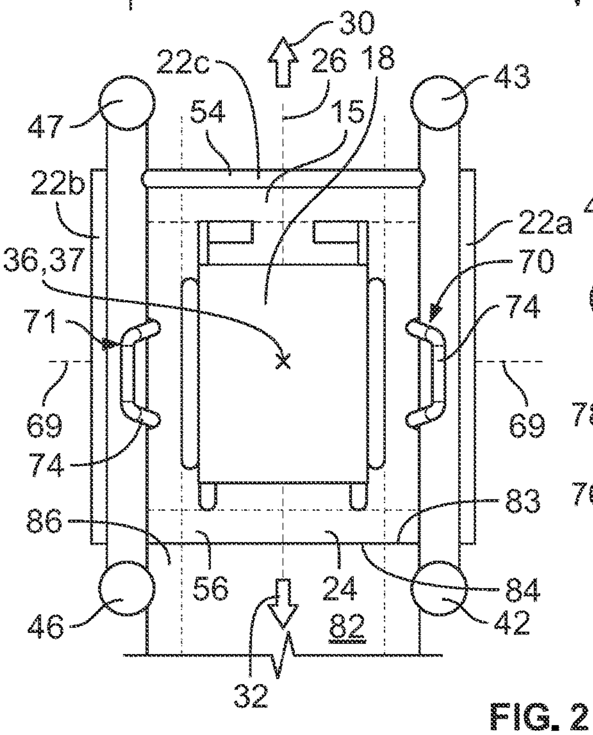
FIG. 2 is a top plan view of the rigid platform of FIG. 1 showing the width of the platform spanning approximately a width of a standard wheelchair to promote centering of the wheelchair on the platform.

Referring now also to FIG. 2, the rider receiving area 24 may be a defined area in which the rider or riders 16 may stand or sit in a wheelchair 18 while the platform 12 is moving. The rider receiving area 24 may be sized to receive at least a width of a standard adult wheelchair 18. A standard adult sized wheelchair 18 may be about 20 to 30 inches wide and may be approximately 26 inches wide measured between the outside of the rear wheels. The width of the rider receiving area 24 may be at least the width of the standard adult sized wheelchair and may be at least the minimum clear width for single wheelchair passage as established by the Americans with Disabilities Act (ADA), for example, a minimum width of 36 inches for a passage length that is over 24 inches. The width of the rider receiving area 24 may be at least approximately 1.5 times the width of the standard adult wheelchair 18 and approximately 1.5 to 3 times the width of the standard adult sized wheelchair 18. The width of the rider receiving area 24 may be less than or equal to 2 or 3 times the width of two standard adult sized wheelchairs 18.

In one embodiment, the width of the rider receiving area 24 may be about 36 to 72 inches corresponding to the passing width of a single wheelchair 18 at a time. In this respect, the width of the rider receiving area 24 encourages one wheelchair 18 to mount the platform 12 at a time and discourages more than one wheelchair 18 from mounting the platform 12, across a width of the platform 12, at one time. In certain embodiments, however, the width of the rider receiving area 24 allow more than one wheelchair 18 to ride the platform 12 at one time, for example, two wheelchairs may fit on the platform 12, across a width of the platform 12. Therefore, the width of the rider receiving area 24 may be about 72 to 108 inches.

Similarly, the rider receiving area 24 may be sized to receive at least a length of a standard adult wheelchair 18. A standard adult sized wheelchair 18 may be about 35 to 45 inches long and may be approximately 42 inches long measured from the back of the rear wheels to the front of the footrests. The length of the rider receiving area 24 may be at least the length of the standard adult sized wheelchair. The length of the rider receiving area 24 may be at least approximately 1.5 times the length of the standard adult wheelchair and approximately 1.5 to 3 times the length of the standard adult sized wheelchair 18. The length of the rider receiving area 24 may be less than or equal to 2 or 3 times the width of the two standard adult sized wheelchairs 18.

In one embodiment, the length of the rider receiving area 24 may be about 45 to 90 inches long corresponding to the length needed to accommodate a single wheelchair 18. In this respect, the length of the rider receiving area 24 encourages one wheelchair 18 to mount the platform 12 at a time and discourage more than one wheelchair 18 from mounting the platform 12, along a length of the platform 12, at one time. In certain embodiments, however, the length of the rider receiving area 24 may allow more than one wheelchair 18 to ride the platform 12 at one time, for example, two wheelchairs may fit on the platform 12 along a length of the platform 12. Therefore, the length of the rider receiving area 24 may be about 90 to 135 inches.

In one embodiment, the rider receiving area 24 may accommodate a single wheelchair 18 of the rider 16 but may also accommodate one or more standing riders 16 accompanying the single wheelchair 18 of the rider 16. In this embodiment, the length of the receiving area 24 may be about 40 to 50 inches and about 45 to 50 inches and approximately 48 inches and the width of the receiving area 24 may be about 40 to 50 inches and about 45 to 50 inches and approximately 48 inches. Therefore, while the rider receiving area 24 discourages the mounting of more than one wheelchair 18, it may be sized to accommodate one wheelchair and one or more standing riders 16 accompanying the rider 16 in the wheelchair 18.

In certain embodiments, the rider receiving area 24 may accommodate more than one wheelchair 18 and one or more standing riders 16 accompanying the more than one wheelchair 18. In this embodiment, the length of the receiving area 24 may be about 90 to 135 inches and the width of the receiving area 24 may be about 72 to 108 inches. Therefore, it may be sized to accommodate, e.g., two wheelchairs and one or more standing riders 16 accompanying the riders 16 in the two wheelchairs 18.

Figure 4:
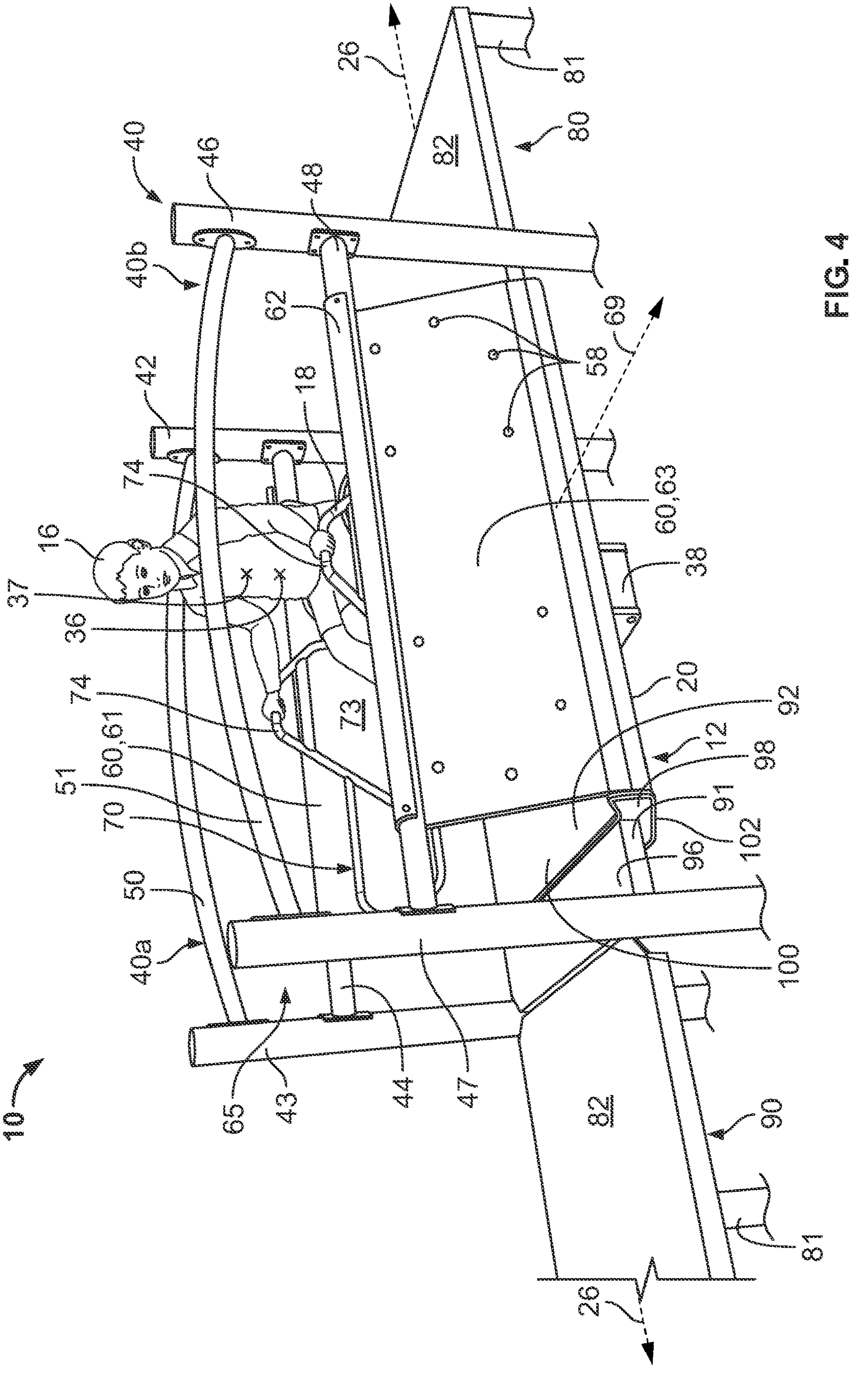
FIG. 4 is a front, right side perspective view of the platform rocker according to an alternative embodiment of the present invention showing the rigid platform flanked by a loading dock and an unloading dock to provide a "pass-through" design.

The size of the rider receiving area 24 generally discourages the rider 16 from maneuvering or rotating the wheelchair 18 within the rider receiving area 24 to change the orientation of wheels of the wheelchair 18 after loading because of the narrow turn radius provided by the rider receiving area 24. Therefore, the wheelchair 18 may be rolled onto the rider receiving area 24 in a forward direction 30 and the wheels of the wheelchair 18 may remain in the forward direction 30 while on the platform 12. The wheelchair 18 may be rolled backward in a backward direction 32 to remove the wheelchair 18 from the "non-pass-through" platform 12 design as seen in FIG. 1, or in a continuing forward direction 30 in a "pass-through" platform 12 design as seen in FIG. 4, eliminating the need for the wheelchair 18 to be turned around or rotated during use and when loading and unloading the rider 16.

The rider receiving area 24 may include a roughened or coarse upper surface 15 to create additional friction between the upper surface and the rider 16 or the rider's wheelchair 18 and to minimize movement of the rider 16 with respect to the upper surface 15 during platform 12 movement. Alternatively, the upper surface 15 may be rubberized for the same reasons.

The raised outer border 22 of the platform 12 may be present along at least two sides, e.g., the left and right lateral edges or sides 66, 68 of the platform 12, to prevent the rider 16 from accidently falling, sliding, or rolling off the sides of the platform 12, for example, during side to side movement of the platform 12. The raised outer border 22 generally defines the outer perimeter of the platform 12, and therefore, surrounds the rider 16 within the receiving area 24 on at least two sides, e.g., three sides (FIG. 1) or two sides (FIG. 4). The raised outer border 22 may be defined by left and right sidewalls 22*a*, 22*b*, which extend upward from the outer edges of the upper surface 15 and are angled downwardly toward the receiving area 24 and, for example, angled toward a center axis 26 of the width of the platform 12 between the left and right edges 66, 68. In some instances, the raised outer border 22 may include a front sidewall 22*c* as described below.

The raised outer border 22 may not be present on at least one side of the platform 12, e.g., one rear side (FIG. 1) or two front and rear sides (FIG. 4) allowing the rider 16 to load and/or unload the platform 12 as described below.

In one embodiment, for example as shown in FIG. 1, the platform 12 may be a "non-pass-through" design which includes a single loading dock 80 on a rear end 54 of the platform 12 only. In this respect, a front end 56 of the platform 12 opposite the loading dock 80 may include a raised outer border 22 being the front sidewall 22*c* which may be a substantially vertical wall approximately 1 to 6 inches in height and prohibiting a rider 16 from falling or sliding off or a rider 16 in a wheelchair 18 from rolling off the front end 56 of the platform 12.

In an alternative embodiment, for example as shown in FIG. 4, the platform 12 may be a "pass-through" design which includes a loading dock 80 on a rear end 54 and an unloading dock 90 on an opposite front end 56 flanking the platform 12. In this respect, the front and rear ends 56, 54 of the platform 12 do not include a raised outer border 22 and thus allow a rider 16 in a wheelchair 18 to roll onto the loading dock 80 and roll forward off the platform 12 onto the unloading dock 90 when unloading without obstruction.

In some embodiments the raised outer border 22 of the platform 12 may be high enough to prevent inadvertent falling, sliding, or rolling off the platform 12 but low enough to allow the rider 16 to mount and unmount the platform with additional force. For example, the raised outer border may be 0.5 to 1 inch in height. In this respect, the raised outer border 22 may be present on all sides of the platform 12 including sides that allow for rider mounting and unmounting of the platform 12 as shown in FIGS. 1 and 4.

The platform 12 may be manufactured of a polymer or plastic mold, for example, by rotational molding polypropylene or polyvinyl chloride. The platform 12 may be generally solid with optionally hollowed areas and may include recesses at the front and/or rear ends 56, 54 as further discussed below.

The size of the rider receiving area 24 and the raised outer border 22 encourages the rider 16 to center themselves on the platform 12 (i.e., centered along the length and width) and therefore promotes a center of gravity 36 of the rider 16 to be substantially centered on the platform 12 and within 12 inches of the center of rotation 37 of the platform 12. For example, the rocking motion of the platform 12 may then be centered, i.e., the center of rotation 37, in close proximity to the center of gravity 36 of the rider 16 therefore minimizing unwanted inertia. In one embodiment, the center of gravity 36 of the rider 16 is within 12 inches of the center of rotation 37 of the platform 12.

A lower surface 20 of the platform 12 may support a weight 38 promoting stability of the platform 12 at rest during loading and unloading of the rider 16. The lower surface 20 of the platform 12 may also attach to one or more motion restraints, for example, at least one flexible belt that is attached to, for example, the left and right lateral sides 66, 68 of the platform 12, respectively. The opposed flexible belts are stretched and compressed as the platform 12 moves side to side, constraining movement and providing a travel stop when the flexible belt is fully stretched at one end.

Referring now to FIG. 1 and FIG. 4, the platform 12 is suspended from a support frame 40 extending generally along the left and right lateral sides 66, 68 of the platform 12. The support frame 40 has a left side frame 40*a* including a pair of vertical support bars 42, 43 supporting a left horizontal support bar 44 on a left side 66 of the platform 12, and a right side frame 40*b* including a pair of vertical support bars 46, 47 supporting a right horizontal support bar 48 on a right side 68 of the platform 12.

As shown in FIG. 1, in one embodiment, the left side frame 40*a* includes a rear vertical support bar 42 defined by a straight upright pole and a front vertical support bar 43 defined by a curved upwardly extending pole. The pair of vertical support bars 42, 43 support the left horizontal support bar 44 extending therebetween at an approximate vertical center of the vertical support bars 42, 43.

The rear vertical support bar 42 is positioned rearward of the platform 12. The front vertical support bar 43 curves rearward from a position forward of the platform 12 toward the rear vertical support bar. Thus, the left horizontal support bar 44 extends a length that is generally greater than the length of the platform 12 to span the rear vertical support bar 42 and the front vertical support bar 43.

An upper horizontal bar 50 may extend between the rear vertical support bar 42 and the front vertical support bar 43 and positioned above the left horizontal support bar 44. The upper horizontal bar 50 may be integral with the front vertical support bar 43 so that the front vertical support bar 43 and upper horizontal bar 50 are defined by a partial arch extending from the ground 14 at a position forward of the platform 12 and extending rearwardly to the rear vertical support bar 43. A supplemental reinforcement bar 49 may extend vertically from a rear end of the upper horizontal bar 50 and be angled forwardly and downwardly to the left horizontal support bar 44 to provide additional support between the upper horizontal bar 50 and the horizontal support bar 44.

The right side frame 40*b* is nearly identical to the left side frame 40*a* and therefore includes front and rear vertical support bars 46, 47 supporting the right horizontal support bar 48 on the right side 68 of the platform 12 and thus corresponding to the vertical support bars 42, 43 and the left horizontal support bar 44, respectively, on the left side 66 of the platform 12, as described above. Similarly, an upper horizontal bar 51 may be integral with the front vertical support bar 47 so that the front vertical support bar 47 and upper horizontal bar 51 are defined by a partial arch extending from the ground 14 at a position forward of the platform 12 to further extend rearwardly to the rear support bar 47. A supplemental reinforcement bar 53 may extend from a rear end of the upper horizontal bar 51 and be angled forwardly and downward to the right horizontal support bar 48 to provide additional support between the upper horizontal bar 51 and the right horizontal support bar 48.

The left horizontal support bar 44 and upper horizontal bar 50 of the left side frame 40*a* extends parallel to the right horizontal support bar 48 and upper horizontal bar 51 of the right side frame 40*b* along the left and right lateral sides, respectively, of the platform 12. The horizontal support bars 44, 48 are generally positioned above and along the left and right sides of the rider receiving area 24 such that the left and right horizontal support bars 44, 48 are positioned inwardly of the outer edges 66, 68 of the platform 12 generally defined by the raised outer border 22. The left and right horizontal support bars 44, 48 may be at a height of about 35 to 45 inches and are approximately 40 inches above the ground 14.

In some embodiments, the upper horizontal bar 50 of the left side frame 40*a* may be connected to the upper horizontal bar 51 of the right side frame 40*b* at a front end of the support frame 40 by a horizontal transverse bar 52 which extends across a front end 56 of the platform 12 and therefore provides an additional forward restraint to the rider 16 above the platform 12.

Turning now to FIG. 4, in an alternative embodiment, the left side frame 40*a* provides a rear vertical support bar 42 defined by a generally straight upwardly extending pole, and a front vertical support bar 43 defined by a generally straight upwardly extending pole. The pair of vertical support bars 42, 43 support a left horizontal support bar 44 extending therebetween at an approximate vertical center of the vertical support bars 42, 43. The rear vertical support bar 42 is positioned rearward of the platform 12 and the front vertical support bar 43 is positioned forward of the platform 12. Therefore, the left horizontal support bar 44 has a length that is greater than the length of the platform 12. An upper horizontal bar 50 may extend between the rear vertical support bar 42 and the front vertical support bar 43 at a position above the left horizontal support bar 44. The upper horizontal bar 50 may be curved to form an arch between the vertical support bars 42, 43.

The right side frame 40*b* is nearly identical to the left side frame 40*a* and therefore includes front and rear vertical support bars 46, 47 and a right horizontal support bar 48 extending along the right side 68 of the platform 12 and corresponding to the front and rear vertical support bars 42, 43 and the left horizontal support bar 44, respectively, on the left side of the platform 12 as described above. An upper horizontal bar 51 may extend from the rear vertical support bar 46 to the front vertical support bar 47 above the right horizontal support bar 48. The upper horizontal bar 51 may be curved to form an arch between the vertical support bars 46, 47.

The left horizontal support bar 44 on the left side frame 40*a* of the support frame 40 extends parallel to the right horizontal support bar 48 on the right side frame 40*b* of the support frame 40 along the left and right lateral sides 66, 68, respectively, of the platform 12. The left and right horizontal support bars 44, 48 may be positioned above and along the left and right sides of the receiving area 24 such that the left and right horizontal support bars 44, 48 are positioned inwardly with respect to the left and right lateral sides 66, 68 of the support frame 40. There is no front horizontal transverse bar 52 (as seen in the "non-pass-through" design of FIG. 1) in the "pass-through" design of FIG. 4, and therefore, this embodiment allows forward motion of the rider 16 to unload off the platform 12.

The support frames 40 of FIG. 1 and FIG. 4 may be manufactured of metal tubing such as galvanized steel tubing. In one embodiment, the tubing of the support frame 40 may have an outer diameter of about 3 to 4 inches and approximately 3.5 inches.

Figure 3:
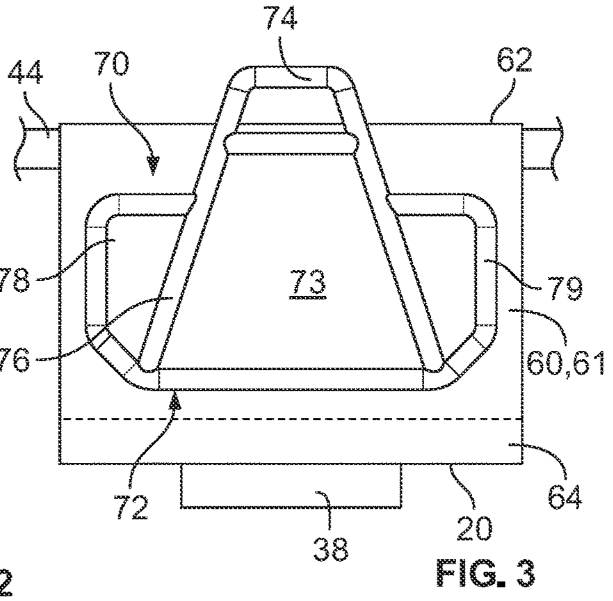
FIG. 3 is an enlarged view of the attachment of the broad flexible belts to the side rails using a wrapping method and attachment of handles to the broad flexible belts of FIG. 1 permitting push and pull of upper ends of the handles to further move the lower ends of the handles side to side.

Referring now to FIG. 1 and FIG. 3, a flexible material 60 may be used to suspend the platform 12 from the horizontal support bars 44, 48 of the support frame 40. The flexible material 60 desirably has a low elasticity (i.e., low stretch) and bends without breaking (high flexibility). The flexible material 60 is thermally stable and maintains flexibility at high and low temperatures. The flexible material 60 is weather resistant and suitable for use when exposed to the environment. In some embodiments, the flexible material 60 may be a polymeric material, natural rubber, synthetic rubber such as neoprene rubber, EPDM rubber, silicone rubber, nitrile rubber, or fabric reinforced rubber sheet material such as a three-ply fabric with rubberized top and bottom layers. The thickness of the flexible material 60 may be about 0.25 to 1 inch and approximately 0.5 inches thick.

The flexible material 60 may be large rectangular belts or sheets of material, for example, a first sheet 61 used to connect the horizontal support bar 44 to the left side 66 of the platform 12 and a second sheet 63 used to connect the horizontal support bar 48 to the right side 68 of the platform 12. The sheets 61, 63 may each have a length that is about the same length as the platform 12 and a height which allows the platform 12 to hang downward from the horizontal support bars 44, 48 approximately 18 to 25 inches below the horizontal support bars 44, 48 and approximately 12 to 24 inches above the ground 14. In one embodiment, the length of the sheets 61, 63 may be about 40 to 50 inches and approximately 48 inches and the height of the sheets 61, 63 may be about 30 to 40 inches and approximately 36 inches.

The sheets 61, 63 may be attached to the horizontal support bars 44, 48, respectively, by wrapping upper ends 62 of the sheets 61, 63 along an inside of the horizontal support bars 44, 48, over a top of the horizontal support bars 44, 48, and around to an outside of the horizontal support bars 44, 48. Before wrapping, the lateral edges of the sheets 61, 63 are pulled taunt along the horizontal support bars 44, 48 to remove slack, and then the upper ends 62 of the sheets 61, 63 are wrapped and fastened to the outside of the horizontal support bars 44, 48 with fasteners, e.g., screws, extending through holes in the sheets 61, 63 and into corresponding holes extending into and along the length of the horizontal support bars 44, 48.

The upper ends 62 of the sheets 61, 63 may be wrapped at least 180 degrees and at least 190 degrees and at least 200 degrees around the horizontal support bars 44, 48. The wrapping method and attachment of the sheets 61, 63 to the outside of the horizontal support bars 44, 48 allows the sheets 61, 63 to swivel toward and away from the inside of the horizontal support bars 44, 48 as the platform 12 glides or sways side to side along a sway axis 69 perpendicular to the horizontal support bars 44, 48. The attachment of the upper ends 62 of the sheets 61, 63 along the entire length of the sheets 61, 63 causes the sheets 61, 63 to be stiff or rigid along the length of the sheets 61, 63 inhibiting the platform 12 from swaying in the forward and backward direction 30, 32, parallel to the horizontal support bars 44, 48, but allowing the sheets 61, 63 to deform along the sway axis 69 to sway side to side.

The lower ends 64 of the sheets 61, 63 may be similarly attached to outer left and right lateral edges 66, 68, respectively, of the platform 12. The lower ends 64 of the sheets 61, 63 may be attached to the outer left and right lateral edges 66, 68, respectively, of the platform 12 using an adhesive or fastened using fasteners, e.g., screws, extending through holes in the sheets 61, 63 and into corresponding holes of the platform 12. Before attachment, the lateral edges of the sheets 61, 63 are pulled taunt along the left and right lateral edges 66, 68 to remove slack. The attachment of the lower ends 64 of the sheets 61, 63 along the entire length of the sheets 61, 63 causes the sheets 61, 63 to be stiff along the entire length of the sheets 61, 63 inhibiting the platform 12 from swaying in the forward and backward direction 30, 32, parallel to the horizontal support bars 44, 48, but may deform along the sway axis 69.

The weight of the platform 12 generally pulls the sheets 61, 63 taunt along the height of sheets 61, 63 between the upper ends 62 and lower ends 64 of the sheets 61, 63. A vertical height (measured along a vertical axis) of the sheets 61, 63 from the horizontal support bars 44, 48 to the platform 12 may be about 20 to 25 inches and approximately 22.5 inches. The vertical height of the horizontal support bars 44, 48 and the sheets 61, 63 places the center of rotation 37 of the platform 12 much closer to the center of gravity 36 of the rider 16. Therefore, minimal force is required to maintain the rocking motion of the platform 12, and oscillation of the platform 12 is more easily maintained. This contrasts with a traditional swing in which the center of rotation 37 of the platform 12 is much farther from the center of gravity 36 of the rider 16, for example, the center of gravity 36 may be three to four times higher than the center of gravity 36 of the rider 16 or the center of gravity 36 may be greater than 12 inches from the center of rotation 37.

The sheets 61, 63, respectively, are angled outwardly from the horizontal support bars 44, 48 to the outer left and right lateral edges 66, 68 of the platform 12 thus providing an enclosed rider receiving volume 65 that is narrower at the top end and widens toward the bottom end giving the rider 16 a feeling of being comfortably enclosed.

It will be appreciated that during movement, the sheets 61, 63 may deform along the sway axis 69 without substantial stretching and is dimensionally stable.

Referring now to FIG. 3, the sheets 61, 63 support handle frames 70, 71, respectively, promoting the movement of the platform 12 side to side along the sway axis 69. The handle frames 70, 71 provide a base frame 72 attached to the inner surface 73 of the sheets 61, 63 and further supporting a handle 74 extending upwardly therefrom.

In one embodiment, the base frame 72 may include a rigid bar forming a trapezoid 76 shape centered on the sheets 61, 63, respectively, but leaving the lower ends 64 of the sheets 61, 63 free to flex along the sway axis 69. The trapezoid 76 generally has a height commensurate with the height of the sheets 61, 63 and a length commensurate with at least half the length of the sheets 61, 63. The base frame 72 further includes front and rear loops 78, 79 extending outwardly from the front and rear sides of the trapezoid 76, respectively, and extending to the front and rear edges of the sheets of 61, 63. In this respect, the base frame 72 extends substantially a full height and length of the sheets 61, 63 but leaving the lower ends 64 of the sheets 61, 63 free to flex. Therefore, flexible or bendable "joints" are created by flexing the sheets 61, 63 at the lower ends 64 below the rigid base frame 72. The base frame 72 is attached to the inner surface 73 using an adhesive or fastened with fasteners 58, e.g., screws, extending along the base frame 72 and through corresponding holes within the sheets 61, 63.

The handle 74 may extend upwardly from the trapezoid 76 and may further extend above the upper end horizontal support bars 44, 48. The handle 74 may be angled with respect to the trapezoid 76 and base frame 72, and thus, may be angled inwardly toward the rider receiving volume 65 in an upward direction from the top of the trapezoid 76 or may be angled in a slightly outward direction toward an outside of the rider receiving volume 65 to a position that makes it comfortable for the rider 16 to grasp the handles 74 with their hands. The handle 74 may be a loop shaped handle or alternatively may be a push/pull handle, handlebar, knob, and the like that allows the rider 16 to grip the handle 74 with their hands and push and pull on the handle 74 along axis 69. The handles 74 are generally centered along the length of the platform 12 to further encourage a centering of the rider 16 along the length of the platform 12.

The position of the handles 74 allows the rider 16 to reach both left and right handles 74 while positioned within the rider receiving volume 65. The distance between the handles 74 is commensurate with the width of the rider receiving area 24. The handles 74 allow the rider 16 to push and pull on the handle frames 70, 71 with their upper body and to therefore deform or bend the flexible sheets 61, 63 at the lower ends 64 side to side along the sway axis 69 and thus causing the platform 12 to sway side to side along the sway axis 69. Therefore, the rider 16 can use primarily upper body strength to create lateral side to side motion of the platform 12.

The handle frames 70, 71 may be manufactured of metal tubing such as galvanized steel tubing. In one embodiment, the tubing of the handle frames 70, 71 may have an outer diameter of about 1 to 3 inches and approximately 2 inches.

Referring now to FIG. 1, in a "non-pass-through" design the rider 16 may mount the platform 12 via a single loading dock 80 supported above the ground 14 by support legs 81 positioned at the rear corners of the dock 80 and the rear vertical support bars 42, 46 proximate the front corners of the dock 80. A cantilevered portion 86 of the loading dock 80 may extend forwardly from the rear vertical support bars 42, 46 to the rear edge 84 of the platform 12. A joining edge 83 of the loading dock 80 may extend along the rear edge 84 of the platform 12. The loading dock 80 has an upper surface 82 that is at approximately the same height as the upper surface 15 of the platform 12 and is substantially level with the platform 12 at rest.

A ramp (not shown) may be used to allow the rider 16 to climb from the ground 14 to the height of the loading dock 80. The rider 16 in the wheelchair 18 may mount the loading dock 80 by rolling the wheelchair 18 upward along the ramp and onto the loading dock 80 as known in the art.

From the loading dock 80, the rider 16 can roll in the forward direction 30 onto the platform 12 at the rear edge 84 of the platform 12 at rest.

The side to side motion of the platform 12 along the sway axis 69 is parallel to the joining edge 83 of the loading dock 80, therefore, movement of the platform 12 is not obstructed by the loading dock 80.

The rider 16 can dismount the platform 12 at rest by rolling the wheelchair 18 in a backward direction 32, back onto the loading dock 80 at the rear edge 84 of the platform 12. The wheelchair 18 can then be rolled from the loading dock 80 downward along the ramp to the ground 14.

It will be appreciated that the rider 16 in the wheelchair 18 can mount and dismount the platform 12 without turning or rotating the wheelchair 18 and therefore the platform rocker assembly 10 may have a smaller footprint installable within a smaller playground area.

Referring to FIG. 4, in a "pass-through" design the rider 16 may mount the platform 12 and dismount the platform 12 via separate loading dock 80 and unloading dock 90. Similar to FIG. 1, the loading dock 80 is supported above the ground 14 by support legs 81 positioned at the rear corners of the dock 80 and the rear vertical support bars 42, 46 proximate the front corners of the dock 80. A cantilevered portion 86 of the loading dock 80 may extend forward of the rear support bars 42, 46 to the rear edge 84 of the platform 12. The joining edge 83 of the loading dock 80 may extend along the rear edge 84 of the platform 12.

The unloading dock 90 is supported above the ground 14 by the front vertical support bars 43, 47 proximate the rear corners of the dock 90 and by support legs 81 positioned at the front corners of the dock 90. A cantilevered portion 96 of the loading dock 90 may extend rearward from the front vertical support bars 43, 47 to the front edge 92 of the platform 12. A joining edge 91 of the unloading dock 90 may extend along the front edge 92 of the platform 12.

The loading dock 80 and unloading dock 90 have upper surfaces 82 that are approximately at the same height as the upper surface 15 of the platform 12 and are substantially level with the platform 12 at rest.

The joining edge 83 of the loading dock 80 and joining edge 91 of the unloading dock 90 may create a "seamless joint" with the rear edge 84 and front edge 92, respectively, of the platform 12. The rear edge 84 and the front edge 92 of the platform 12 may include concave rectangular recesses 98 having an upper wall 100 and a lower wall 102 extending along the full width of the rear edge 84 and front edge 92 and with open side ends. The recesses 98 are wide enough to allow joining edges 83, 91 of the cantilevered portions 86, 96, respectively, of the docks 80, 90 to fit inside the recesses 98 and between the upper wall 100 and the lower wall 102. Therefore, as the platform 12 sways side to side, the upper wall 100 and the lower wall 102 of the recesses 98 of the rear edge 84 and the front edge 92 of the platform 12 receive the joining edges 83, 91 of the cantilevered portions 86, 96 therein. The upper wall 100 may be slightly angled to provide an inclined surface upward from the upper surface 82 of the docks 80, 90 to the upper surface 15 of the platform 12. In some embodiments, the lower wall 102 can be omitted.

It is appreciated that a similar "seamless joint" may be applied to the embodiment shown in FIG. 1 with respect to the joining edge 83 of the loading dock 80 with the rear edge 84 of the platform 12.

Upward and downward ramps (not shown) may be used to allow the rider 16 to climb from ground 14 to the height of the loading dock 80 and to lower from the unloading dock 90 back to the ground 14 as known in the art. The rider 16 in the wheelchair 18 may mount the loading dock 80 by rolling the wheelchair 18 upward along the upward ramp and onto the loading dock 80. From the loading dock 80, the rider 16 can roll in the forward direction 30 onto the platform 12 at the rear edge 84 of the platform 12 at rest.

The side to side movement of the platform 12 along the sway axis 69 is parallel to the joining edges 83 of the loading dock 80 and the joining edge 91 of the unloading dock 90, therefore, movement of the platform 12 is not obstructed by the loading dock 80 and the unloading dock 90.

The rider 16 can dismount the platform 12 at rest by rolling the wheelchair 18 in the forward direction 30 onto the unloading dock 90. The wheelchair 18 can be rolled from the unloading dock 90 downward along a downward ramp to the ground 14.

The rider 16 in the wheelchair 18 can mount and dismount the platform 12 without turning or rotating the wheelchair 18 and can keep movement of the wheelchair 18 to a single direction. The "pass-through" design further permits connection of physically separated playground elements, the platform rocker assembly thus acting as a bridge or connector element between playground separated elements.

In use, the rider 16 may mount the platform 12 via the loading dock 80 of FIG. 1 or FIG. 4. The weight of the platform 12 will minimize movement of the platform 12 during loading. The rider 16 in a wheelchair 18 is generally centered on the platform 12 between the horizontal support bars 44, 48 and between the front and back of the platform 12. Additional riders 16 may stand on the platform 12 to a side of the rider 16 in the wheelchair 18.

When the rider 16 wishes to initiate movement, the rider 16 will grasp the upwardly extending handles 74 at the left and right sides 66, 68 of the platform 12. The rider 16 will push and pull the handles 74 in a same direction, for example, both in a left direction or both in a right direction, to create momentum and cause the platform 12 to sway side to side along the sway axis 69. The platform 12 will rock, sway or sway side to side substantially within a horizontal plane of the platform 12. The lateral side to side travel distance along the sway axis 69 may be about 10 to 20 inches and about 10 to 15 inches and approximately 12 inches. The platform 12 does not substantially move up and down, or in forward and backward directions.

The platform 12 exhibits a natural oscillation like a pendulum. Once a natural pattern and frequency is reached, the input force required to maintain the motion is minimized by the inertia of the platform 12, but the inertia is naturally controlled by the reduced distance, e.g., less than 12 inches, between the center of rotation 37 of the platform 12 and the center of gravity 36 of the rider 16. This contrasts with a swing in which a resistance element may be needed to control the high levels of inertia created by the center of rotation 37 of the platform 12 and the center of gravity 36 of the rider 16 being farther apart.

Once the platform 12 is in the rest position, the rider 16 can dismount the platform 12 via the loading dock 80 (FIG.

1) by motion in the backward direction 32 or via the unloading dock 90 (FIG. 4) by motion in the forward direction 30.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. A rocker assembly comprising:

a support frame providing at least one horizontally extending support bar extending along an axis;

a platform of rigid material having a length extending forward and backward along the axis and a width extending side to side perpendicular to the axis, the platform positioned between the at least one horizontally extending support bar perpendicular to the axis; and at least one connector attached to the at least one horizontally extending support bar on a top end and attached to sides of the platform on an opposite bottom end and configured to suspend the platform below the at least one horizontally extending support bar and above the ground wherein the at least one connector extends continuously along a length of the at least one horizontally extending support bar to permit side to side motion of the platform perpendicular to the axis and resist forward and backward motion of the platform; and at least one upwardly extending handle attached to the at least one connector.

2. The assembly of claim 1 wherein the at least one connector is a flexible sheet material wrapped around the at least one horizontally extending support bar.

3. The assembly of claim 1 wherein the at least one connector extends continuously along the sides of the length of the platform.

4. The assembly of claim 3 wherein the at least one connector is a flexible sheet material wrapped around the sides of the length of the platform.

5. The assembly of claim 1 wherein the at least one connector is a flexible sheet material deformable in a direction perpendicular to the axis only.

6. The assembly of claim 5 wherein the at least one flexible sheet material is not substantially deformable along the axis.

7. The assembly of claim 1 wherein the at least one handle extends rigidly upwardly from the at least one flexible sheet and extends rigidly downwardly along the at least one flexible sheet material toward the platform.

8. The assembly of claim 1 further comprising an elevated border extending upwardly along at least one edge of the platform.

9. The assembly of claim 1 wherein the platform has a width that is less than a width of two standard adult wheelchairs and has a length that is less than a length of two standard adult wheelchairs.

10. The assembly of claim 1 wherein the platform has a width that is less than a width of three standard adult wheelchairs and has a length that is less than a length of three standard adult wheelchairs.

11. The assembly of claim 1 wherein the platform is suspended at least 12 inches above the ground.

12. The assembly of claim 1 further comprising a loading dock having an upper surface that is substantially a height of the platform above the ground wherein the loading dock is at a first side of the platform and wherein the first side of the platform extends perpendicular to the axis.

13. The assembly of claim 12 further comprising an unloading dock having an upper surface this is substantially a height of the platform above the ground, wherein the unloading dock is at a second side of the platform, opposite the first side, wherein the second side of the platform extends perpendicular to the axis.

14. A method of swaying on a playground rocker comprising:

providing a rocker assembly having a support frame providing at least one horizontally extending support bar extending along an axis, a platform of rigid material having a length extending along the axis and a width extending perpendicular to the axis, the platform positioned between the at least one horizontally extending support bar, at least one connector attached to the at least one horizontally extending support bar on a top end and attached to sides of the platform on an opposite bottom end and configured to suspend the platform below the at least one of horizontally extending support bar and above the ground wherein the at least one connector extends continuously along a length of the at least one horizontally extending support bar to permit side to side motion of the platform perpendicular to the axis and resist forward and backward motion of the platform, and at least one upwardly extending handle attached to the at least one connector;

a rider mounting the platform along the axis from a raised loading dock;

the rider swaying the platform in a direction perpendicular to the axis by moving the at least one upwardly extending handle back and forth; and the rider unmounting the platform along the axis.

15. The method of claim 13 wherein the at least one connector is a flexible sheet material and further comprising wrapping the at least one flexible sheet material around the at least one horizontally extending support bar on a first end and wrapping the at least one flexible sheet material around sides of the platform on an opposite second end.

16. The method of claim 13 wherein mounting the platform and unmounting the platform by the rider is in opposite directions along the axis.

17. The method of claim 13 wherein mounting the platform and unmounting the platform by the rider is in a same direction along the axis.

18. The method of claim 13 wherein a center of rotation of the platform during swaying motion is within 12 inches of a center of gravity of the rider on the platform.

19. A rocker assembly comprising:

a support frame providing at least one horizontally extending support bar extending along an axis;

a platform of rigid material having a length extending along the axis and a width extending perpendicular to the axis, the platform positioned between the at least one horizontally extending support bar perpendicular to the axis;

at least one connector attached to the at least one horizontally extending support bar on a first end and attached to sides of the platform on an opposite second end and configured to suspend the platform below the at least one of horizontally extending support bar and above the ground wherein the at least one connector extends continuously along a length of the at least one horizontally extending support bar to permit side to side motion of the platform perpendicular to the axis and resist forward and backward motion of the platform; and at least one handle attached to the at least one connector to provide a flexing of the connector between the handle and the platform, the connector flexing to change an angle between the connector and the platform as the platform moves side to side.

* * * * *